United States Patent
Walacavage et al.

(10) Patent No.: US 7,702,491 B2
(45) Date of Patent: Apr. 20, 2010

(54) METHOD OF PART FLOW MODEL FOR PROGRAMMABLE LOGIC CONTROLLER LOGICAL VERIFICATION SYSTEM

(75) Inventors: Joseph G. Walacavage, Ypsilanti, MI (US); Jim D. Coburn, Cleveland Heights, OH (US)

(73) Assignee: Ford Global Technologies, LLC, Dearborn, MI (US)

( * ) Notice: Subject to any disclaimer, the term of this patent is extended or adjusted under 35 U.S.C. 154(b) by 1461 days.

(21) Appl. No.: 09/965,905

(22) Filed: Sep. 28, 2001

(65) Prior Publication Data

US 2002/0040290 A1    Apr. 4, 2002

Related U.S. Application Data

(60) Provisional application No. 60/236,964, filed on Sep. 29, 2000.

(51) Int. Cl.
G06G 7/48    (2006.01)
(52) U.S. Cl. ............ 703/6; 703/1; 703/7; 700/97
(58) Field of Classification Search ........... 700/245, 700/97; 703/1, 7, 6
See application file for complete search history.

(56) References Cited

U.S. PATENT DOCUMENTS

| | | | |
|---|---|---|---|
| 4,510,565 A | | 4/1985 | Dummermuth |
| 4,831,549 A | * | 5/1989 | Red et al. ............ 700/254 |
| 4,928,221 A | | 5/1990 | Belkhiter |
| 4,998,206 A | | 3/1991 | Jones et al. |
| 5,050,088 A | | 9/1991 | Buckler et al. |
| 5,119,318 A | * | 6/1992 | Paradies et al. ........ 706/52 |
| 5,249,135 A | | 9/1993 | Fujita |
| 5,377,116 A | | 12/1994 | Wayne et al. |
| 5,377,315 A | | 12/1994 | Leggett |
| 5,388,051 A | | 2/1995 | Seki et al. |
| 5,402,349 A | | 3/1995 | Fujita et al. |
| 5,574,637 A | | 11/1996 | Obata et al. |
| 5,644,493 A | | 7/1997 | Motai et al. |
| 5,691,711 A | | 11/1997 | Jorgensen |
| 5,758,123 A | | 5/1998 | Sano et al. |
| 5,796,618 A | | 8/1998 | Maeda et al. |
| 5,963,447 A | | 10/1999 | Kohn et al. |
| 5,991,533 A | | 11/1999 | Sano et al. |
| 6,167,406 A | | 12/2000 | Hoskins et al. |
| 6,185,469 B1 | | 2/2001 | Lewis et al. |
| 6,223,134 B1 | | 4/2001 | Rust et al. |

(Continued)

FOREIGN PATENT DOCUMENTS

EP    0 508 308 A3    4/1992

(Continued)

OTHER PUBLICATIONS

Jerry Banks, ed.; Handbook of Simulation; 1998; John Wiley & Sons, Inc., pp. 3-51.*

(Continued)

*Primary Examiner*—Jason S. Proctor
(74) *Attorney, Agent, or Firm*—Bliss McGlynn, P.C.

(57) ABSTRACT

A method is provided for application of part flow model for a programmable logic controller logical verification system. The method includes the steps of constructing a part flow model, determining whether the part flow model is acceptable, and using the part flow model to test PLC code to build a manufacturing line.

19 Claims, 1 Drawing Sheet

U.S. PATENT DOCUMENTS

| | | | |
|---|---|---|---|
| 6,263,487 | B1 | 7/2001 | Stripf et al. |
| 6,292,707 | B1 | 9/2001 | Hair et al. |
| 6,292,715 | B1 | 9/2001 | Rongo |
| 6,442,441 | B1 | 8/2002 | Walacavage et al. |
| 6,470,301 | B1 * | 10/2002 | Barral .......................... 703/1 |
| 6,526,373 | B1 * | 2/2003 | Barral .......................... 703/6 |
| 6,618,856 | B2 * | 9/2003 | Coburn et al. ............... 717/135 |
| 6,847,922 | B1 * | 1/2005 | Wampler, II ................... 703/1 |
| 6,928,337 | B2 | 8/2005 | Watanabe et al. |
| 2002/0193972 | A1 | 12/2002 | Kudo et al. |
| 2003/0045947 | A1 | 3/2003 | Wampler |
| 2003/0074170 | A1 | 4/2003 | Watanabe et al. |

OTHER PUBLICATIONS

Todd LeBaron and Kelly Thompson; Emulation of a Material Delivery System; 1998; Proceedings of the 1998 Winter Simulation Conference; pp. 1055-1060.*

Kowdle Prasad, Analysis of an Advanced Manufacturing Cell Through Computer Simulation, 1989, IEEE, pp. 277-285.*

S. Manivannan and Jerry Banks; Real-Time Control of a Manufacturing Cell using Knowledge-Based Simulation; 1991; Proceedings of the 1991 Winter Simulation Conference; pp. 251-260.*

Matthew W. Rohrer, Automod Tutorial, 1997, Proceedings of the 1997 Winter Simulation Conference, p. 657-662.*

Fernando Gonzalez, "A Simulation-Based Controller Builder for Flexible Manufacturing Systems", 1996, Proceedings of the 1996 Winter Simulation Conference, pp. 1068-1075.*

Fernando Gonzalez and Wayne Davis, "A Simulation-Based Controller for Distributed Discrete-Event Systems with Application to Flexible Manufacturing", 1997, Proceedings of the 1997 Winter Simulation Conference, pp. 845-852.*

Cynthia Erickson et al., "Simulation, Animation, and Shop-Floor Control", 1987, Proceedings of the 1987 Winter Simulation Conference, pp. 649-653.*

Lee Schruben, "Simulation Modeling with Event Graphs", 1983, ACM, Communications of the ACM, vol. 26, No. 11, pp. 957-963.

Tyler Phillips, "AutoMod™ by Autosimulations", 1998, Proceedings of the 1998 Winter Simulation Conference, pp. 213-218.

Diedra L. Donald, "A Tutorial on Ergonomic and Process Modeling Using Quest and IGrip", 1998, Proceedings of the 1998 Winter Simulation Conference, pp. 297-302.

Jerry Banks, ed., "Handbook of Simulation", 1998, John Wiley & Sons, pp. 519-545.

S. Kanai, T. Kishinami, "A Virtual Vertification Environment for the Sequence Control System Using VRML and JAVA," 1999 by ASME, pp. 1-8.

"ThermaView Advanced Welder Diagnostics System," 1998.

Beck et al., "Applying a Component-Based Software Architecture to Robotic Workcell Applications". IEEE Transactions on Robotics and Automation, vol. 16, No. 3, Jun. 2000.

Frey et al. "Formal Methods in PLC Programming", IEEE International Conference on Systems, Man and Cybernetics, Nashville, Tennessee, Oct. 2000.

Leduc, Ryan James, "PLC Implementation of DES Supervisor for a Manufacturing Testbed: An Implementation Perspective", Thesis submittal, Graduate Department of Computer and Electrical Engineering, University of Toronto, 1996, pp. i-xv, 50-51, 129-143, obtained via http://www.cas.mcmaster.ca/~leduc/rleduc-masc.pdf.

S. Vedapudi, "Using MCM to do Emulation of a Car Assembly Line", Brooks Automation Symposium, 2001, pp. 1-4.

W. Dong, F. Palmquist, and S. Lidholm, "A Simple and Effective Emulation Tool Interface Development for Tricept Application", Proceedings of the 33rd ISR, Oct. 7-11, 2002, 4 pages.

Matthew Rohrer, "AutoMod Product Suite Tutorial (AutoMod, Simulator, AutoSat) by Autosimulations", Proceeding of the 1999 Winter Simulation Conference, pp. 220-226.

B. F. Boczkaj, Software Aspects of PLCs Application in Robotic Workcells, 1996 IEEE.

P. Petruska, J. N. Marcincin, M. Doliak, ROANS—Intelligent Simulation and Programming System for Robots and Automated Workcell, 1997.

W. Dai, M. Kampker, PIN-A PC-Based Robot Simulation and Offline Programming System Using Macro Programming Techniques, 1999 IEEE.

* cited by examiner

METHOD OF PART FLOW MODEL FOR PROGRAMMABLE LOGIC CONTROLLER LOGICAL VERIFICATION SYSTEM

CROSS-REFERENCE TO RELATED APPLICATION(S)

The present application claims the priority date of copending U.S. Provisional patent application Ser. No. 60/236,964, filed Sep. 29, 2000.

BACKGROUND OF THE INVENTION

1. Field of the Invention

The present invention relates generally to programmable logic controllers and, more specifically, to a method of part flow model for a programmable logic controller logical verification system for manufacturing a motor vehicle.

2. Description of the Related Art

It is known that programmable logic controller code is written by controls engineers after assembly tooling designs are completed and a manufacturing process has been defined. The creation of the programmable logic controller code is mostly a manual programming task with any automation of the code generation limited to "cutting and pasting" previously written blocks of code that were applied to similar manufacturing tools. Once the programmable logic controller code is written, it is used by a programmable logic controller to build subsequent hard tools used in the manufacture of parts for motor vehicles. The programmable logic controller code is not validated (debugged) until the hard tools are built and tried. A significant portion of this tool tryout process is associated with the debugging of the programmable logic controller code at levels of detail from a tool by tool level, to a workcell level, and finally at a tooling line level.

It is also known that a manufacturing line is typically made of three to twenty linked workcells. Each workcell consists of a fixture to position product (sheet metal) and associated automation (robots) that process the product (welding). The workcell typically consists of a fixture/tool surrounded by three or four robots. The product is then transferred to the next workcell in the manufacturing line for further processing, until it exits the manufacturing line.

It is further known that the workcells for a manufacturing line can be modeled before the manufacturing line is implemented. The modeling techniques, such as Robcad from Tecnomatix and Igrip from Deneb, for the manufacturing process are limited in scope to a workcell level, due to how these type of technologies represent and manipulate three dimensional data and tool motions. It is still further known that there are two PLC simulation systems commercially available, one from SST called PICS and the other from CAPE Software called VPLink. However, neither simulation system has an explicit part flow model for discrete part manufacturing. It is further known that part flow model simulation software exists known as "Discrete Event Simulation". Although Discrete Event Simulation software uses an explicit part flow model, the parts are active and engage resources as they move through the system. The software also makes use of an event clock that is incompatible with the needs of the PLC emulation for continuous time.

In manufacturing plant floor operations, programmable logic controllers (PLCs) execute PLC code through sensing where parts are located within the tooling by using sensors/switches. The representations of parts and part flow are unique and necessary within a Virtual PLC (VPLC) to accurately portray the logical condition of the manufacturing process to the inputs of a PLC. Without part movement in the VPLC that can be "sensed", the emulated PLC would be unable to exercise its code for even its basic function of automatic sequencing.

Therefore, it is desirable to provide a method for application of a part flow model as part of a programmable logic controller logical verification system. It is also desirable to provide a method for logical modeling and simulation of parts that hold information specific to manufacturing processes that the parts have been routed through. It is further desirable to provide a method of part flow as a component of the VPLC to allow additional uses beyond verifying PLC logic such as routing and quality testing. Therefore, there is a need in the art to provide a method that meets these desires.

SUMMARY OF THE INVENTION

Accordingly, the present invention is a method of part flow model for a programmable logic controller logical verification system. The method includes the steps of constructing a part flow model, determining whether the part flow model is acceptable, and using the part flow model to test PLC code to build a manufacturing line.

One advantage of the present invention is that a method is provided for application of a part flow model as part of a programmable logic controller logical verification system. Another advantage of the present invention is that the method allows an operator to determine whether the PLC control design being planned will work as intended, prior to physically building the tools/manufacturing line. Yet another advantage of the present invention is that the method lessens the dependency of vendor tool tryout (VTTO) to prove out if the PLC control design is robust. Still another advantage of the present invention is that the method directly shortens product development timing, supporting faster vehicle program launch timing. A further advantage of the present invention is that the method allows a manufacturing line integrator to have an accurate representation of a control strategy without the cost of either developing a separate simulation or waiting until the plant floor is operating to debug their system. Yet a further advantage of the present invention is that the method allows both the controls developer and the information integrator to use the same part flow model present in the VPLC, resulting in substantial cost and time savings.

Other features and advantages of the present invention will be readily appreciated, as the same becomes better understood, after reading the subsequent description taken in conjunction with the accompanying drawings.

DESCRIPTION OF THE PREFERRED EMBODIMENT(S)

Figure 1:
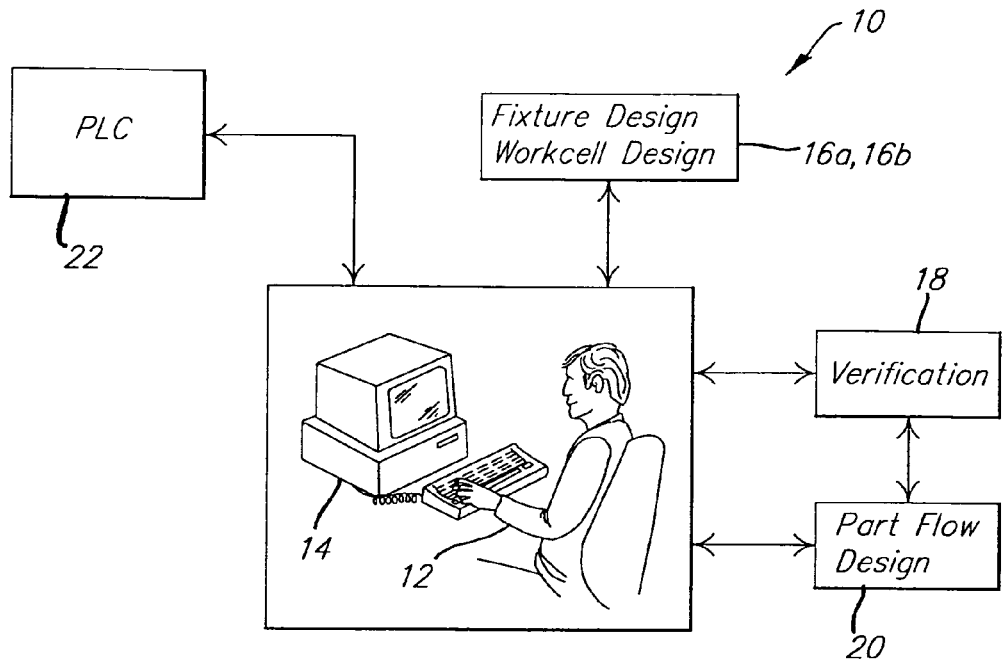
FIG. 1 is a diagrammatic view of a system, according to the present invention, for using a method of part flow model for a programmable logic controller logical verification system illustrated in operational relationship with an operator.

Referring to the drawings and in particular FIG. 1, one embodiment of a system 10, according to the present invention, for application of part flow model as part of a PLC logical verification system 18 to be described is shown. In the present invention, a user 12 uses a computer 14 for the part flow model. The computer 14 sends and receives information from fixture design system 16a and workcell design system 16b via an electronic link. The fixture design system 16a and workcell design system 16b provide engineering data for standard components, tools, fixture models, and robots to interact with the fixture models. The computer 14 sends and receives information with a PLC logical verification system 18 via an electronic link. The PLC logical verification system 18 verifies the PLC logic for a workcell of a tooling or manufacturing line. The computer 14 also sends and receives information with a part flow design 20 via an electronic link. The part flow design 20 sends and receives information with the PLC logical verification system 18 to verify the PLC code. Once the PLC code is analytically verified, it is exported by the computer 14 via an electronic link to at least one PLC 22. The PLC 22 is then used at physical tool build to produce or build a workcell (not shown), which is used in a tooling line (not shown) for the manufacture of parts (not shown) for a motor vehicle (not shown). It should be appreciated that the computer 14, electronic links, and PLC 22 are conventional and known in the art.

Figure 2:
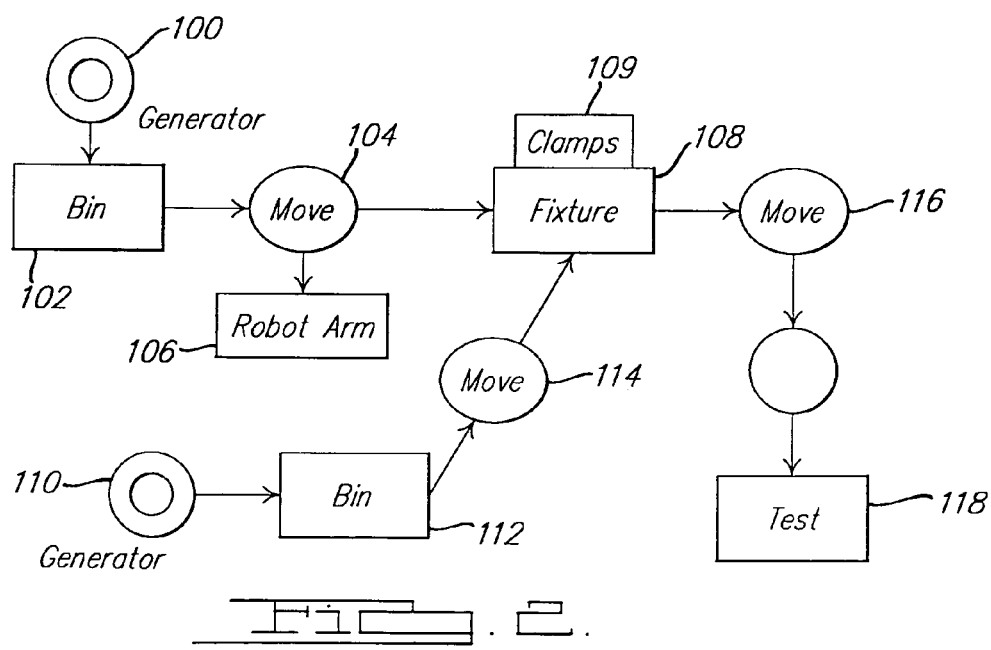
FIG. 2 is a diagrammatic view of a method, according to the present invention, for application of part flow model as part of the programmable logic controller logical verification system of FIG. 1.

Referring to FIG. 2, a method, according to the present invention, for application of part flow model as part of the PLC logical verification system 18 is shown. In general, the user 12 identifies part locations, including movement between stationary locations, on a VPLC workspace of the computer 14 using a part location editor of the computer 14. Each location has the capability of having resources attached to it, including part location switches. The collection of part locations make up a directed graph that, coupled with a part generator, allows the user 12 to visually see the flow of parts through the PLC logical verification system 18 by change of color (indicating the presence of a part) at any of the part locations. It should be appreciated that, once a basic part flow model has been implemented, the method may be extended in more elaborate data movement schemes.

The method begins by writing a control model file for standard component, tool, and fixture models by the fixture design system 16a. For example, the fixture design system 16a will create a control model definition that describes how four clamps need to be sequenced along with a hard-tooled welder. It should be appreciated that the control model is information that describes events, dependencies, and logical conditions that are used to drive modeling software to be described.

The method reads the control model file from the fixture design system 16a by a workcell design system 16b. The method writes to a control model file for workcell models, incorporating information from the control model file from the fixture design system 16a. For example, if a fixturing station has robots or flexible automation involved, the workcell design system 16b will import the fixture and processing data defined in the control model file from the fixture design system 16a, allowing the user to add robots to interact with the fixture and clamps. It should be appreciated that several control model files may be written by the workcell design system 16b.

The method includes writing a control model file for part flow by the part flow design system 20. For example, the part flow design system 20 will create a part flow model definition that describes how a part flows through a workcell such as moving from a bin into a fixture. It should be appreciated that the part flow model is information that describes events, dependencies, and logical conditions that represent or simulate part flow through the workcell.

The method reads and manages all control model files required to model a tooling or manufacturing line by the PLC logical verification system 18. The PLC logical verification system 18 also has the ability to manage large amounts of computer aided drafting (CAD) data. The PLC logical verification system 18 is predominately a collector of data and a viewing tool, not a creator of data.

The method writes a control model file by the PLC logical verification system 18 to "logically link" the fixtures of the fixture design system 16a and the workcells of the workcell design system 16b and the part flow of the part flow design system 20 into a tooling or manufacturing line. The method plays a control model by the PLC logical verification system 18, which is driven by the control model described within the control model files.

Referring to FIG. 2, a method, according to the present invention, for part flow model for the PLC logical verification system 18 is shown. The method starts with a part generator in bubble 100. The part generator is a representation of some part such as a vehicle quarter panel selected by the user 12. The part generator generates a part type such as a front driver side quarter panel and serial number such as body style. From bubble 100, the method advances to block 102 and the part generator generates a unique part from a part location such as a bin of the parts. The method advances to bubble 104 and moves the part from the bin to another part location. To move the part, the user 12 selects a resource such as a robot having at least one capability such as a robotic arm in block 106 to move the part from the bin to another part location such as a fixture. The method advances to block 108 and loads the part in the fixture. The user 12 selects a fixture such as a clamp in block 109 to secure the part in the fixture. It should be appreciated that the part locations (moving and stationary) have status (part present or no part present). It should also be appreciated that the part moves through the PLC logical verification system 18 via color change on the computer 14.

The method may also proceed from bubble 110 by selecting another part generator as previously described. The method advances to block 112 and the part generator generates a part from a bin in block 112 as previously described. The method advances to bubble 114 and moves the part from the bin as previously described. The method advances to block 108 and loads the part in the fixture as previously described. It should be appreciated that the fixture is a location to which the part is moved. It should also be appreciated that multiple parts may be represented with the method.

From block 108, the method advances to bubble 116 and moves the part from the fixture to block 118 and tests the part. The user 12 tests the logic by forcing a state in the control logic to test all exception logic. For example, the method tests for status as to whether the part is present or not present. After block 118, the method then ends. It should be appreciated that part locations have exit conditions that are interlocked. It should also be appreciated that a record exists with each part generated and that the individual resources can contribute information to the part record (such as an action performed or another part being bound to it). It should further be appreciated that the unique part record can be tested as it traverses the workcell, which allows subsystem capabilities such as quality and routing to be exercised. It should yet further be appreciated that the method may incorporate unique serialized parts, part types, and part assemblies. It should still further be appreciated that the method is an iterative process between design and simulation carried out on the computer 14 by the user 12.

After the part flow model is designed, the method includes playing the part flow model by the PLC logical verification system 18. For example, the user 12 plays the part flow model by the PLC logical verification system 18 on the computer 14. The method includes determining whether the part flow model is acceptable. For example, the user 12 determines whether the part has traversed the workcell successfully. If the part flow model is not acceptable, the method includes modifying the part flow model. The user 12 uses the iterative process to change resources and capabilities of the part record and runs or simulates the part flow model with the PLC logical verification system 18 until it is acceptable to the user 12. Once the part flow model is acceptable to the user 12, the method includes generating PLC code and using the PLC code to build a manufacturing line. It should be appreciated that the part flow model is similar to a floor plan and is the basis for the PLC code.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A method of part flow for a programmable logic controller logical verification system, said method comprising the steps of:
   constructing a simulation model of a manufacturing line using a computer;
   playing the simulation model by a PLC logical verification system on the computer and viewing a flow of a part through the manufacturing line by a user, wherein the PLC logical verification system dynamically interacts through input and output with the simulation model to verify a PLC code of the manufacturing line;
   determining if the part flow represented in the simulation model is correct to the user;
   generating the PLC code if the part flow represented in the simulation model is correct; and
   using the generated PLC code and implementing the manufacturing line according to the part flow simulation model.

2. A method as set forth in claim 1 wherein said step of constructing comprises selecting a part generator.

3. A method as set forth in claim 2 wherein said step of constructing further comprises generating the part with the part generator.

4. A method as set forth in claim 3 wherein said step of constructing further comprises identifying part locations of the generated part within the manufacturing line.

5. A method as set forth in claim 4 wherein said step of constructing further comprises testing the generated part at the part locations.

6. A method as set forth in claim 1 wherein said step of constructing comprises constructing a record for the part.

7. A method as set forth in claim 6 wherein the record has at least one resource.

8. A method as set forth in claim 7 wherein the at least one resource has at least one capability.

9. A method as set forth in claim 1 including the step of modifying the part flow represented in the simulation model if the part flow represented in the simulation model is not correct.

10. A method as set forth in claim 1 including the step of modifying the part flow represented in the simulation model if the part flow represented in the simulation model is not correct.

11. A method for application of a part flow for a programmable logic controller logical verification system, said method comprising the steps of:
    constructing a simulation model of a part flow in a manufacturing line using a computer by representing a part and part locations of the manufacturing line;
    playing the simulation model by a PLC logical verification system on the computer to move the represented part to and from the part locations within the manufacturing line and viewing a flow of the represented part through the manufacturing line by a user by collecting the part locations of the simulation model and coupling the collection of part locations with a part generator, wherein the PLC logical verification system dynamically interacts through input and output with the simulation model to verify a PLC code of the manufacturing line;
    determining if the part flow represented in the simulation model is correct to the user;
    generating the PLC code if the part flow simulation model is correct; and
    using the generated PLC code and implementing the manufacturing line according to the part flow simulation model.

12. A method as set forth in claim 11 wherein said step of constructing comprises selecting a part generator.

13. A method as set forth in claim 12 wherein said step of constructing further comprises generating a part with the part generator.

14. A method as set forth in claim 13 wherein said step of constructing further comprises identifying part locations of the generated part in the manufacturing line.

15. A method as set forth in claim 14 wherein said step of constructing further comprises testing the generated part at the part locations.

16. A method as set forth in claim 11 wherein said step of constructing comprises constructing a record for the part.

17. A method as set forth in claim 16 wherein the record has at least one resource.

18. A method as set forth in claim 17 wherein the at least one resource has at least one capability.

19. A method for application of a part flow for a programmable logic controller logical verification system, said method comprising the steps of:
    constructing a simulation model of a part flow in a manufacturing line using a computer by selecting a part generator, generating a part with the part generator, and identifying part locations of the part in the manufacturing line;
    playing the simulation model of the part flow by a PLC logical verification system on the computer to move the generated part to and from locations within the manufacturing line and viewing a flow of the part through the manufacturing line by a change of color at any of the part locations by a user by collecting the part locations of the simulation model and coupling the collection of part locations with the part generator, wherein the PLC logical verification system dynamically interacts through input and output with the simulation model to verify a PLC code of the manufacturing line;
    determining if the part flow represented in the simulation model is correct to the user;
    modifying the part flow represented in the simulation model if the part flow represented in the simulation model is not correct;
    generating the PLC code if the part flow simulation model is correct; and
    using the generated PLC code and implementing the manufacturing line according to the part flow simulation model.

* * * * *